United States Patent [19]

Inoue

[11] E Patent Number: Re. 32,855

[45] Reissued Date of Patent: Feb. 7, 1989

[54] CAPACITOR-TYPE PULSE GENERATOR FOR ELECTRICAL DISCHARGE MACHINING, ESPECIALLY FOR WIRE-CUTTING EDM

[75] Inventor: Kiyoshi Inoue, Tokyo, Japan

[73] Assignee: Inoue-Japax Research Incorporated, Yokohama, Japan

[21] Appl. No.: 851,792

[22] Filed: Apr. 10, 1986

Related U.S. Patent Documents

Reissue of:

[64] Patent No.: 4,442,333
Issued: Apr. 10, 1984
Appl. No.: 238,123
Filed: Feb. 25, 1981

[30] Foreign Application Priority Data

Feb. 26, 1980 [JP] Japan ..... 55-23574

[51] Int. Cl.[4] ..... B23P 1/08

[52] U.S. Cl. ..... 219/69 W; 219/69 S; 219/69 P; 219/69 M

[58] Field of Search ..... 219/69 C, 69 P, 69 S, 219/69 M, 69 W, 69 R

[56] References Cited

U.S. PATENT DOCUMENTS

| | | | |
|---|---|---|---|
| 2,773,168 | 12/1956 | Williams | 219/69 |
| 2,794,152 | 5/1957 | Matulaitis | 219/69 P |
| 2,804,575 | 8/1957 | Matulaitis | 315/163 |
| 3,014,155 | 12/1961 | Inoue | 315/171 |
| 3,098,149 | 7/1963 | Inoue | 219/69 |
| 3,109,120 | 10/1963 | Scarpell | 219/69 P |
| 3,286,127 | 11/1966 | Henry | 315/209 |
| 3,292,040 | 12/1966 | Ullmann et al. | 315/165 |
| 3,333,081 | 7/1967 | Inoue | 219/69 |
| 3,485,987 | 12/1969 | Porterfield | 219/69 P |
| 3,549,851 | 12/1970 | Hockenberry et al. | 219/69 P |
| 3,627,966 | 12/1971 | Osenbruggen et al. | 219/69 |
| 3,697,719 | 10/1972 | Verner et al. | 219/69 P |
| 3,705,287 | 12/1972 | Saito et al. | 219/69 P |
| 3,878,437 | 4/1975 | Cuker | 219/69 S |
| 3,922,518 | 11/1975 | Pfau | 219/69 |
| 3,956,609 | 5/1976 | Marendaz | 219/69 P |
| 4,163,887 | 8/1979 | Buhler et al. | 219/69 P |
| 4,303,957 | 12/1981 | Bell, Jr. et al. | 219/69 S |

FOREIGN PATENT DOCUMENTS

| | | | |
|---|---|---|---|
| 48-41385 | 12/1973 | Japan . | |
| 50-101997 | 1/1974 | Japan . | |
| 54-141492 | 11/1979 | Japan . | |
| 812012 | 4/1956 | United Kingdom . | |
| 2016169 | 9/1979 | United Kingdom | 219/69 P |

*Primary Examiner*—M. H. Paschall
*Attorney, Agent, or Firm*—Herbert Dubno

[57] ABSTRACT

A capacitor-type pulse generator is provided for wire-cutting EDM. The generator includes a capacitor connected on one hand to a DC source in series with a charging switch and on the other hand to the EDM gap in series with a discharging switch. A first sensing circuit turns the discharging switch into conduction when the charging voltage on the capacitor reaches a predetermined level. The charging switch is normally in its conductive state and is turned into its nonconductive state when a second sensing circuit senses that the EDM gap voltage exceeds a preselected value. In a modified generator, parallel-connected discharging switches are triggered in sequence when the capacitor voltage reaches the predetermined level.

10 Claims, 1 Drawing Sheet

CAPACITOR-TYPE PULSE GENERATOR FOR ELECTRICAL DISCHARGE MACHINING, ESPECIALLY FOR WIRE-CUTTING EDM

Matter enclosed in heavy brackets [ ] appears in the original patent but forms no part of this reissue specification; matter printed in italics indicates the additions made by reissue.

FIELD OF THE INVENTION

The present invention relates to a capacitor-type power-supply system for electrical discharge machining (EDM), the system being especially suitable for wire-cutting EDM.

BACKGROUND OF THE INVENTION

In electrical discharge machining, a tool electrode is spacedly juxtaposed with a workpiece to form a machining gap therewith flooded with a machining liquid of dielectric nature, and a succession of electrical pulses are applied across the machining gap to produce discrete time-spaced electrical discharges between the tool electrode and the workpiece through the liquid medium. Each electrical discharge, when fired or triggered at the machining gap regulated as to appropriate dielectric and conductivity conditions, results in stock removal from the workpiece. A succession of such electrical discharges may occur at the machining gap held under an optimum state to cumulatively remove material from the workpiece. As material removal proceeds, the tool electrode is displaced relative to the workpiece generally to maintain the gap spacing substantially constant. In three-dimensional or sinking-type EDM, the shape and the path of displacement of the tool electrode determine the configuration of a cavity formed in the workpiece.

In wire-cutting EDM, the tool electrode is a continuous wire composed of, say, copper or brass and having a thickness ranging generally between 0.05 and 0.5 mmϕ. The wire electrode is continuously displaced axially through a cutting zone in which the workpiece is disposed. The cutting zone is defined generally between a pair of wire guides arranged for supporting the wire electrode tightly therebetween so that the wire electrode linearly travels through the cutting zone while traversing the workpiece. The machining liquid is commonly a water medium of a specific resistivity ranging between $10^2$ and $10^5$ ohm-cm and continuously supplied into the machining gap defined between the traveling wire electrode and the workpiece. A contouring feed is effected between the traveling wire electrode and the workpiece transversely to the wire axis along a prescribed path so that a desired contour of the shape determined by the path is formed in the workpiece.

One of the power supplies for providing machining pulses, which has been recognized to be suitable in the art of EDM and which has been found to be particularly advantageous in wire-cutting EDM, is a capacitor-type pulse generator in which a capacitor is connected on one hand in series with a DC source and is connected on the other hand across the machining gap defined between the electrode and the workpiece. The capacitor is periodically charged by the output voltage of the DC source, the charge stored on the capacitor in each charging cycle being impulsively discharged through the machining gap, thereby forming an individual machining pulse. A periodically operated switch may be included in the circuit connecting the DC source to the capacitor to insure the periodicity of charging without fail. A further switch may be included also in the circuit connecting the capacitor to the machining gap and turned on when the charging voltage on the capacitor reaches a predetermined level so that the occurence of any incomplete or premature discharge to the machining gap may be avoided.

One of the most important problems peculiar to wire-cutting operations is that of wire breakage which should be minimized. The breakage most often occurs when machining pulses of excessive energy are supplied to the machining gap. The approach taken by the prior art for wire-cutting EDM operation with a capacitor-type power supply as described to avoid wire breakage is therefore to limit the output voltage of the DC source to a sufficiently low level so that no such voltage buildup develops on the capacitor and the machining gap that may result in a gap discharge of excessive energy, i.e. an impulse of excessive peak current and duration. This approach, however, entails an undesirable increase in the capacitor charging time in each charging cycle and an excessive decrease in the discharge energy, hence a significant drop in the discharge repetition rate and mean machining current. As a consequence, the rate of material removal has been undesirably low.

OBJECTS OF THE INVENTION

It is accordingly a primary object of the present invention to provide an improved capacitor-type pulse generator system for wire-cutting EDM whereby a significant increase in the removal rate over prior systems is achieved practically without breakage of the wire electrode.

Another object of the invention is to provide a capacitor-type pulse generator which is efficient and stable in operation and which can be used for general EDM operations.

A specific object of the invention is to provide a capacitor-type EDM pulse generator which allows the use of a charging source of greater voltage output, thereby permitting a wire-cutting EDM operation to be achieved with an extremely high rate of material removal and with due precision, yet practically without breakage of the wire electrode.

SUMMARY OF THE INVENTION

These and other objects are attained, in accordance with the present invention, with an improved capacitor-type pulse generator for electrical discharge machining, which generator includes a capacitor, a DC source for charging the capacitor, switch means connected in series with the capacitor and an EDM machining gap and a sensing circuit responsive to the charging voltage on the capacitor for rendering the switch means conductive upon the charging voltage reaching a predetermined level, thereby permitting the charge on the capacitor to be discharged through the machining gap, and which generator also includes a second switch means connected in series between the DC source and the capacitor and normally held conductive to permit the capacitor to be charged by the DC source and a second sensing circuit responsive to the gap voltage for rendering the second switch means nonconductive upon the gap voltage exceeding a preselected value.

The charging DC source for the capacitor can thus be of an increased output voltage which may be more than twice the discharge voltage. The discharge voltage can be held at a level which is low enough to avoid gap discharges of excessive energy that may result in breakage of the wire electrode but is sufficient to allow discharges of optimum energy. Since the use of an increased charging voltage becomes possible, then the capacitor is charged at an increased rate, thus permitting optimum dicharges to be effected at an increased frequency or with a reduced time proportion of pulse intervals or off-times.

The first-mentioned switch means may comprise a plurality of switches connected in parallel with one another in series between the capacitor and the machining gap. The first-mentioned sensing circuit may then be adapted to successively turn the switches into conduction so that the charge on the capacitor is discharged through the machining gap in the form of a succession of discharge pulses.

BRIEF DESCRIPTION OF THE DRAWING

These and other objects, features and advantages of the present invention will become more readily apparent from the following description taken with reference to the accompanying drawing in which.

SPECIFIC DESCRIPTION

Figure 1:
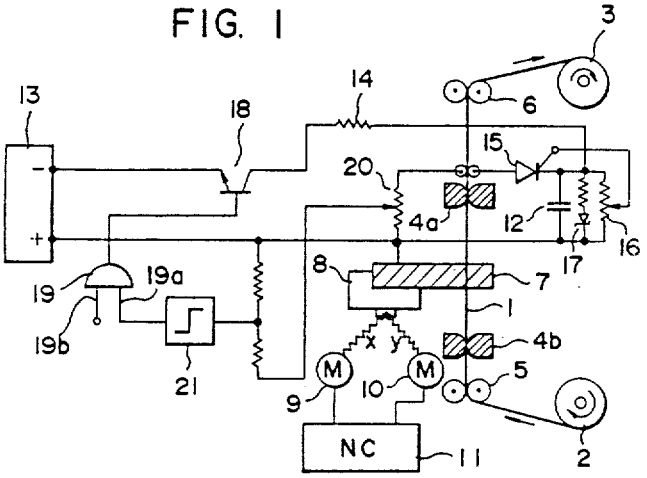
FIG. 1 is a schematic diagram illustrating a wire-cutting EDM arrangement and a capacitor-type pulse generator constructed therefor according to the invention.

Referring to FIG. 1, a wire-cutting EDM arrangement makes use of a continuous wire electrode 1 composed of, say, copper or brass and having a thickness ranging generally between 0.05 and 0.5 mm$\phi$. The wire electrode 1 is continuously transported from a supply side 2 shown in the form of a supply reel to a collection side 3 shown in the form of a takeup reel through a cutting zone defined between a pair of machining guides 4a and 4b. Further guides 5 and 6 are provided in the path of wire travel to change the direction of wire travel from the supply side 2 to the cutting zone and from the latter to the takeup side 3. Drive and brake roller units (not shown) are provided between the guide 6 and the takeup reel 3 and between the supply reel 2 and the guide 5, respectively, to axially displace the wire electrode 1 at an appropriate rate of displacement and under a suitable tension. In the cutting zone, a workpiece 7 is securely mounted on and carried by a worktable 8, and the latter is driven in an X-Y plane by a pair of motors 9 and 10 in response to drive signals furnished from a numerical controller 11. The motor 9 is adapted to displace the worktable 8 along an X-axis and the motor 10 is adapted to displace the worktable 8 along a Y-axis orthogonal to the X-axis. Data for a predetermined contouring path preprogrammed in the numerical controller 1 is reproduced in the form of the drive signals which are applied to the X-axis motor 9 and the Y-axis motor 10 to displace the workpiece 7 along the predetermined path tranversely to the axis of the wire electrode 1, thereby forming a desired contour in the workpiece 7 as the latter is machined by the traveling wire electrode 1. In the machining process, the machining liquid is typically a water medium of a specific resistivity ranging generally between $10^2$ and $10^5$ ohm-cm, and is supplied continuously to the cutting zone from a nozzle (not shown) to flush the machining gap defined between the wire electrode 1 and the workpiece 7.

The power supply for providing machining pulses across the machining gap is constituted by a capacitor-type pulse generator which includes a capacitor 12 charged by a DC source 13 via a charging resistor 14. The discharging circuit connecting the capacitor 12 to the wire electrode 1 and the workpiece 7 includes a discharge switch 15 constituted by a thyristor. The charging voltage on the capacitor 12 is sensed at a resistor 16 connected in parallel with the DC source 13 and the capacitor 12. When the voltage which develops at the sensing resistor 16 exceeds a predetermined level, the thyristor 15 is turned on to connect the capacitor 12 to the wire electrode 1 and the workpiece 7 and thus to permit the charge on the capacitor 12 to be discharged through the machining gap, thereby providing a machining current pulse. When the discharge diminishes, the switch 15 is returned to its off state and the capacitor 12 is allowed to recharge from the DC source 13. A Zener diode 17 is connected across the capacitor 12 to prevent the latter from being charged to an excessive level.

In accordance with the present invention, the pulse generator includes a switch 18 shown in the form of a transistor whose principal electrodes are connected in series between the DC source 13 and the capacitor 12. Typically, a bank of such transistors constitute the switch 18. The control electrodes of the switch 18 lead from the output of an AND gate 19. The AND gate 19 is normally enabled to hold the switch 18 in conduction, thus permitting the capacitor 12 to be periodically charged by the DC source 13. The charge stored on the capacitor 12 in each charging cycle is discharged through the machining gap in the manner described. The sensing circuit for the discharge voltage comprises a resistor 20 connected to the wire electrode 1 and the workpiece 7 in parallel with the capacitor 12. There is no response by the sensing resistor 20 to the charging voltage for the capacitor 12. A Schmitt-trigger circuit 21 is provided to respond to the voltage which appears at the resistor 20. When the voltage at the resistor 20 exceeds a preselected level, the Schmitt-trigger circuit 21 is phase-reversed to provide an "O" signal which is applied to one input terminal 19a of the AND gate 19 to disable the latter. Another input 19b of the AND gate 19 is always furnished with a "1" signal. The input to the Schmitt-trigger circuit 21 appears only during the discharging cycle of the capacitor 12.

By virtue of the foregoing arrangement, the DC source 13 may have its output voltage much increased compared with prior art arrangement. The use of the increased source voltage accelerates the charging cycle for the capacitor 12. The constancy of the charging level over successive cycles is assured by the resistor 16 and the discharge switch 15, and further by the Zener diode 17 optionally included. Each discharge commences at a constant voltage level and hence assures constancy of the energy discharges. Each discharge is then sharply cut off by turn-off of the discharge switch 15, permitting the charging cycle to recommence. While the switch 15 is in on-state or the discharge continues, when the gap voltage increases above a preselected value, the Schmitt-trigger circuit 21 is phase-reversed and the switch 18 in the charging circuit is turned off, disconnecting the capacitor 12 from the DC source 13. Then there will be no charging current flowing to the capacitor 12. This condition continues until the gap voltge is again reduced to a normal level. Thus any excessive gap voltage buildup is detected and monitored by the sensing resistor 20 and the threshold Schmitt-trigger circuit 21 to turn off the switch 18 incorporated in the charging circuit for the capacitor 12. This allows the output voltage of the DC source 13 to be set at a sufficient high level, even more than twice the charging voltage, without the risk of breakage of the wire electrode 1. Since the capacitor 12 is thus charged at an accelerated rate by virtue of the increased voltage charging source 13, the effective rate of repetition of machining discharges is markedly increased. Hence an marked improvement in removal rate, cutting efficiency and operational stability is achieved.

Figure 2:
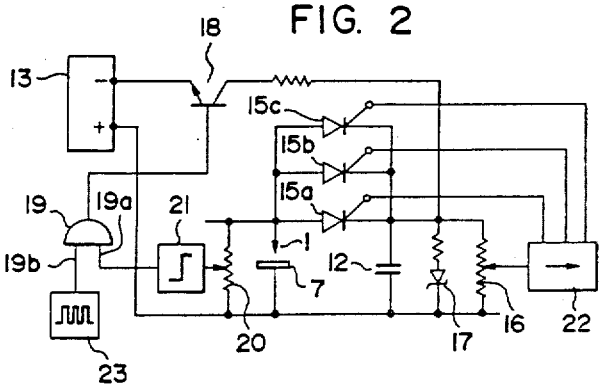
FIG. 2 is a schematic diagram of another pulse generator according to the invention.

Referring to FIG. 2 wherein the same reference numerals are used to refer to the same elements as used in the embodiment of FIG. 1, a modified form of the capacitor-type power supply for EDM is shown. In this embodiment, the discharge switch means comprises a plurality of thyristors 15a, 15b and 15c connected in parallel with one another in series with the capacitor 12, a tool electrode 1 and a workpiece 7. These switches 15a, 15b, and 15c are designed for successive triggering by a control circuit or pulser 22 such as a ring-counter pulser connected with the sensing resistor 16. When the voltage on the capacitor manifested by the voltage at the sensing resistor 16 reaches a predetermined level, the pulser 22 is actuated to furnish a number of, here three, trigger pulses in succession. These trigger pulses are applied to successively turn the switches 15a, 15b and 15c into conduction. As a result, the charge on the capacitor 12 is discharged through the cap, divided in three discrete or time-spaced discharge pulses. This form of switching is particularly advantageous where a capacitor 12 of greater capacitance is desirable or in the interest of increasing the discharge repetition rate and the removal rate.

Further in this embodiment, the AND gate 19 for controlling the switch 18 has one input terminal 19b fed with a train of signal pulses furnished from an oscillator 23. Another input terminal 19a is fed with the output of the Schmitt-trigger circuit 21 which is normally "1" and becomes "0" when the gap voltage exceeds a preselected value as already described. Thus, the switch 18 is controlled by the logical product of these inputs fed to the AND gate 19. In a normal machining condition, the switch 18 is periodically energized with signal pulses of the oscillator 23 and thereby turned into conductive and nonconductive states alternatively with the times of the states or on time and off time set at the oscillator 23. The capacitor 12 is charged with a train of pulses from the DC source 13. When an excessive gap voltage is ascertained by the sensing resistor 20 and the Schmitt-trigger circuit 21, the AND gate 19 is disabled to pass the signal pulses of the oscillator 23 to the switch 18, thereby interrupting the on-off switching operation and molding the switch 18 in the off state.

The pulse generator according to the invention is advantageous not only for wire-cutting EDM but also for sinking-type EDM using a shaped tool electrode. An increased rate of repetition of machining discharges is achieved by capacitor charging at an accelerated rate and results in an increased rate of material removal. The controlled interruption of capacitor charging on the occasion of an excessive gap voltage buildup provides avoidance of electrical discharges of an abnormally increased energy and assures repetition of discharges of equalized energy content. Hence an improvement in the surface roughness and overcut is obtained as well.

What is claimed is:

1. A capacitor-type pulse generator for wire-cutting EDM, comprising:

a capacitor;

a DC source having an output voltage for charging said capacitor;

first switch means connected in series with said capacitor, a wire electrode and a workpiece, said wire electrode and said workpiece defining an EDM gap therebetween;

a first sensing circuit responsive to the charging voltage on said capacitor for turning said first switch means into conduction upon said charging voltage reaching a predetermined level, thereby permitting the charge on said capacitor to be discharged through said EDM gap whereby to form at least one EDM pulse;

second switch means connected in series with said DC source and said capacitor and normally held conductive to permit said capacitor to be charged by said DC source to said predetermined level, said output voltage of said DC source being at least twice said predetermined charging level; and a second sensing circuit responsive to the EDM gap voltage for turning said second switch means into nonconduction upon the EDM gap voltage exceeding a preselected value.

2. The pulse generator defined in claim 1 wherein said first switch means comprises a plurality of switches connected in parallel with one another and in series with said capacitor and said EDM gap and said first sensing circuit is adapted for triggering said switches successively into the conductive states.

3. The pulse generator defined in claim 1 or claim 2, further comprising an oscillator for providing said second switch means with a train of signal pulses whereby said second switch means is normally switched on and off repetitively to pulsively charge said capacitor with the output voltage of said DC source.

*4. A method of operating a wire-cutting EDM, capacitor-type pulse generator comprising the steps of:*

*(a) charging a capacitor from a DC source, said capacitor being connected in series with a first switch means and a wire EDM gap, and said DC source having an ouptut voltage in excess of a predetermined level to charge said capacitor at an accelerated rate;*

*(b) generating a signal which is a function of capacitor voltage;*

*(c) upon said signal reaching said predetermined level, turning said first switch means into conduction to permit the charge on said capacitor to be discharged through said EDM gap; and*

*(d) upon said signal exceeding a preselected value, turning a second switch means connected in series between said DC source and said capacitor from a conductive state in which said capacitor is charged to a nonconductive state.*

*5. A method of operating a wire-cutting EDM, capacitor-type pulse generator, comprising the steps of:*

*(a) charging a capacitor from a DC source, said capacitor being connected in series with a first switch means and a wire EDM gap, and said DC source having an output voltage in excess of a predetermined level to charge said capacitor at an accelerated rate;*

(b) generating a first signal which is a function of capacitor voltage;

(c) upon said first signal reaching said predetermined level, turning said first switch means into conduction to permit the charge on said capacitor to be discharged through said EDM gap;

(d) generating a second signal which is a further of wire EDM gap voltage; and (e) upon said second signal exceeding a preselected value, turning a second switch means connected in series between said DC source and said capacitor from a conductive state in which said capacitor is charged to a nonconductive state.

6. A method of operating a wire-cutting EDM, capacitor-type pulse generator comprising the steps of:

(a) charging a capacitor from a DC source, said capacitor being connected in series with a first switch means and a wire EDM gap, and said DC source having an output voltage in excess of a predetermined level to charge said capacitor at an accelerated rate;

(b) sensing capacitor voltage and generating a signal which is a function of the sensed capacitor voltage;

(c) upon said signal reaching said predetermined level, turning said first switch means into conduction to permit the charge on said capacitor to be discharged through said EDM gap; and (d) upon said signal exceeding a preselected value, turning a second switch means connected in series between said DC source and said capacitor from a conductive state in which said capacitor is charged to a nonconductive state.

7. A method of operating a wire-cutting EDM, capacitor-type pulse generator comprising the steps of:

(a) charging a capacitor from a DC source, said capacitor being connected in series with a first switch means and a wire EDM gap, and said DC source having an output voltage in excess of a predetermined level to charge said capacitor at an accelerated rate;

(b) sensing capacitor voltage and generating a first signal which is a function of the sensed capacitor voltage;

(c) upon said first signal reaching said predetermined level, turning said first switch means into conduction to permit the charge on said capacitor to be discharged through said EDM gap;

(d) sensing wire EDM gap voltage and generating a second signal which is a function of the sensed wire EDM gap voltage; and (e) upon said second signal exceeding a preselected value, turning a second switch means connected in series between said DC source and said capacitor from a conductive state in which said capacitor is charged to a nonconductive state.

8. A method of operating a wire-cutting EDM, capacitor-type pulse generator comprising the steps of:

(a) charging a capacitor from a DC source to impress a voltage across said capacitor, said capacitor being connected on the one hand in series with a first electronic switch means and a wire-EDM gap which together constitute a capacitor discharging circuit and being connected on the other hand in series with said DC source and a second electronic switch means which together constitute a capacitor charging circuit, said DC source having an output voltage in excess of a predetermined capacitor voltage charging level so that said capacitor is charged at an accelerated rate, said second switch means being closed for charging said capacitor;

(b) closing said first switch means when said voltage across said capacitor reaches said predetermined level in step (a) to provide a voltage across said wire-EDM gap; and (c) opening said second electronic switch means in said capacitor charging circuit when said voltage across said wire-EDM gap in step (b) exceeds a preselected value.

9. The method of operating a wire-cutting EDM, capacitor-type pulse generator set forth in claim 8 wherein said second switch means is repetitively closed and opened by a first electronic timing means whereby said capacitor is pulsively charged.

10. The method of operating a wire-cutting EDM, capacitor-type pulse generator set forth in claim 4, 5, 6, 7, or 8 wherein the magnitude of said preselected value is greater than the magnitude of said predetermined level.

* * * * *